United States Patent [19]

Wilkerson

[11] 4,074,443
[45] Feb. 21, 1978

[54] ATOM DEMONSTRATOR

[76] Inventor: Edward D. Wilkerson, P.O. Box 755, South Court, Normandy Beach, N.J. 08739

[21] Appl. No.: 742,193

[22] Filed: Nov. 16, 1976

[51] Int. Cl.² ............................................. G09B 23/26
[52] U.S. Cl. ..................................... 35/18 A; 40/502
[58] Field of Search .................. 35/18 R, 18 A, 46 R, 35/47, 42.5; 40/77; 240/10.1

[56] References Cited

U.S. PATENT DOCUMENTS

| 2,483,216 | 9/1949 | Marshall | 35/42.5 |
| 2,516,418 | 7/1950 | Ramsay | 35/18 A |
| 2,522,098 | 9/1950 | Coste | 35/46 R X |
| 2,601,729 | 7/1952 | Underwood | 35/18 A |
| 3,086,299 | 4/1963 | Wilkerson | 35/46 R |
| 3,205,593 | 9/1965 | Busey | 35/46 R |

OTHER PUBLICATIONS

"Dynamic Atom Models" p. 308, Welch Scientific Co., Oct. 1965.

Primary Examiner—Harland S. Skogquist

[57] ABSTRACT

An atom demonstrator, particularly for the electrons, including a globe having spaced light bulbs on its surface. When the globe is rotated about two perpendicular axes simultaneously by a double gimbal or double yoke construction in a dimly lit room, the glowing bulbs scribe vivid curvilinear paths representing electron motion.

1 Claim, 7 Drawing Figures

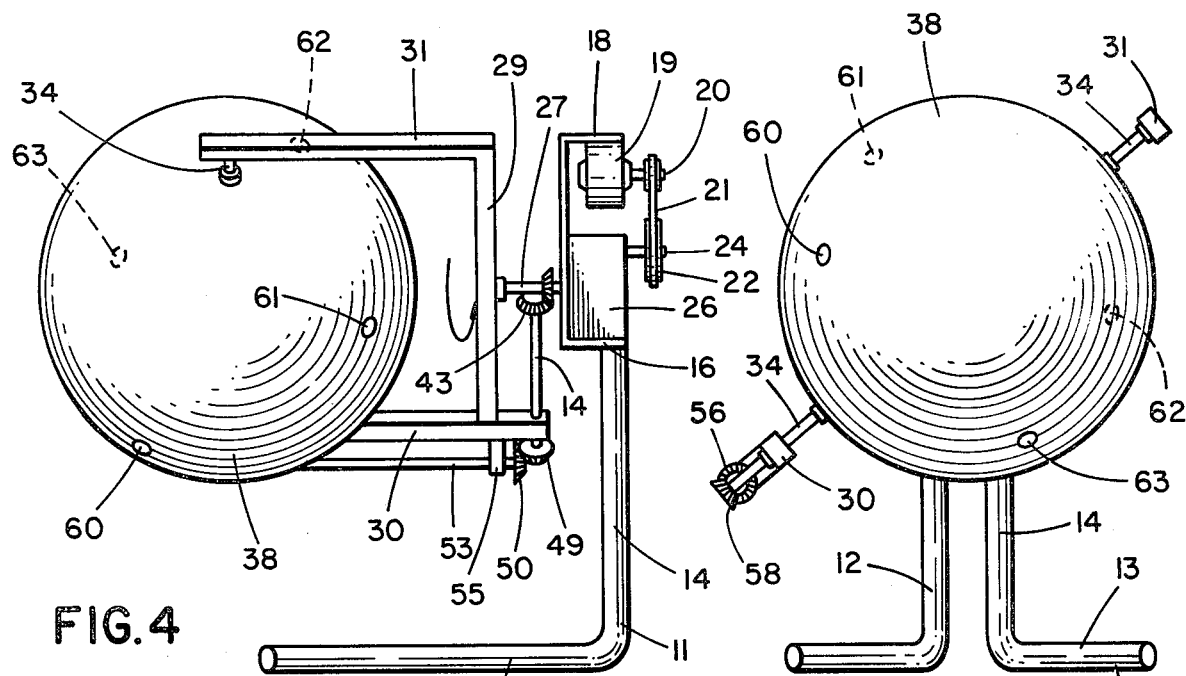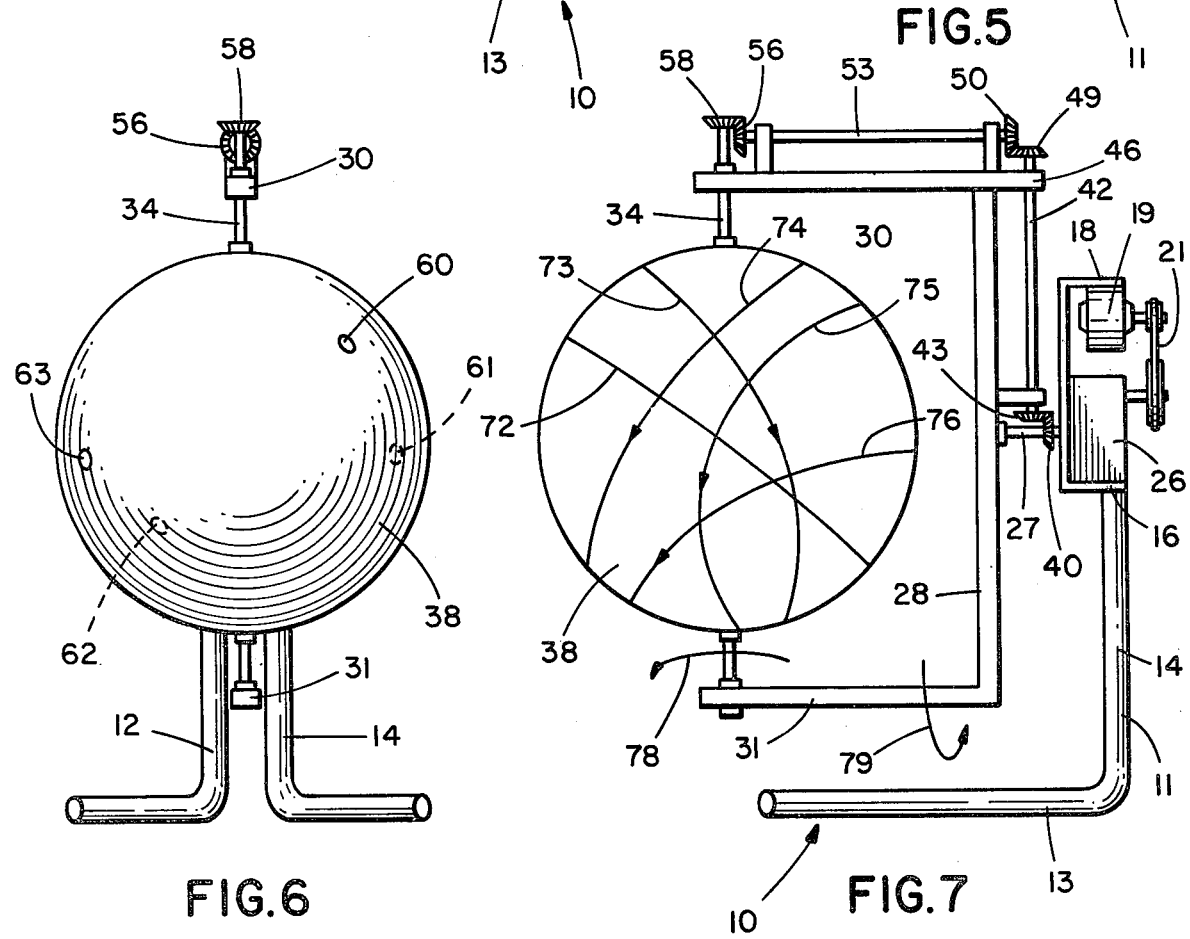

ATOM DEMONSTRATOR

BACKGROUND OF THE INVENTION

Since the development of the nuclear theory of composition of matter, man has attempted to depict, in various forms, the motion of the atom. It is generally accepted that the electrons orbit in some fashion about the nucleus. The electrons are said to orbit in different "rings", or shells, with each "ring" being an imaginary circle surrounding the nucleus. Each ring has, at least in one theory, a different number of electrons with the first ring usually having two electrons, the second-8, etc.. However, because of what I believe to be an inadequately developed theory, scientists have been unable to accurately show the dynamic motion of the electron. In two dimensional static representations in pictoral form, the electrons are conventionally shown moving in a circular path about the nucleus. This is not, in my opinion, an accurate representation of the motion of the electrons.

There have been many three dimensional movable devices designed to demonstrate the motion of the atom. Most include a plurality of elements representing electrons, protons and neutrons, each rotatable about an axis. This single axis theory of electron motion is, in my opinion, not correct.

It is a primary object of the present invention to provide a device that accurately depicts the dynamic motion of the electron.

SUMMARY OF THE PRESENT INVENTION

In accordance with the present invention, I have provided a device to demonstrate with lights, the dynamic motion of electrons about the nucleus of an atom. In the construction of this demonstrator, I have assumed that the motion of the electron is not orbital in a stationary plane. Instead, I conceive of the electron having components of movement in two directions. That is, while the electron orbits about the nucleus, it does so in an imaginary sphere, and in a curvilinear path in such a sphere. While there may be no concrete experimental evidence to substantiate this assumption or conclusion, there is also none to deny it. But my invention resides not only in this conception but also in the device to demonstrate this curvilinear motion of the electron.

Toward this end, I have provided a globe with light bulbs spaced at 90 degree intervals about the globe in a plane. The globe is rotated about two perpendicular axes. This is accomplished through the provision of a double gimbal, or double yoke construction. Double gimbal constructions are not new by themselves, but they have never, to my knowledge, been used to demonstrate the motion of an electron.

The gimbals or yokes are then rotated at substantially the same uniform speeds, each about a stationary axis, by a drive motor and gearing arrangement. When this demonstrator is placed in a dimly lit room, with the light bulbs on the globe glowing, and the drive motor and yoke rotating the globe about two perpendicular axes simultaneously, the glowing bulbs will scribe curvilinear paths in space that provide a vivid and dynamic representation of the true motion of the electron.

BRIEF DESCRIPTION OF THE DRAWINGS

FIG. 4 is a right side view of the atom demonstrator with the yoke and globe each rotated approximately 45°;

FIG. 5 is a front view of the atom demonstrator with the yoke and globe positioned as shown in FIG. 4;

FIG. 6 is a front view of the atom demonstrator with the yoke and globe positioned as shown in FIG. 1; and FIG. 7 is a right side view of the atom demonstrator with the approximate paths of the bulbs being illustrated on the globe.

DETAILED DESCRIPTION OF THE PREFERRED EMBODIMENT

Figure 1:
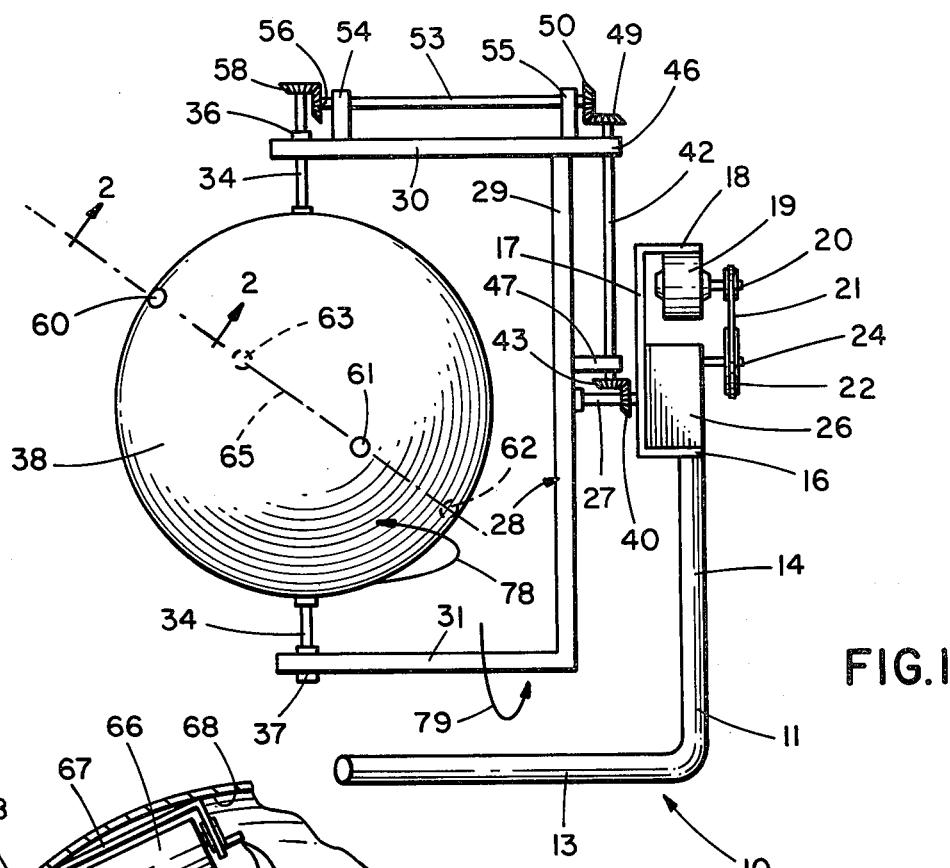
FIG. 1 is a right side view of the present electron demonstrator.
Figure 2:
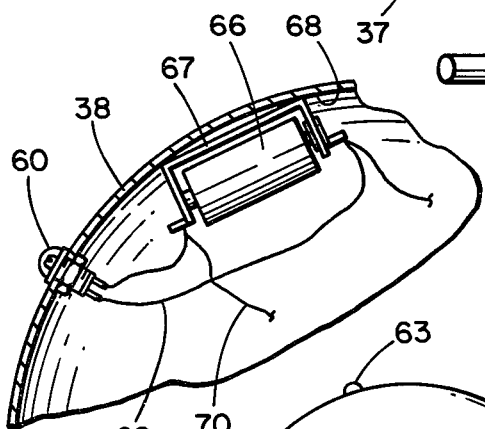
FIG. 2 is an enlarged fragmentary section taken generally along line 2—2 of FIG. 1.

Referring to the drawings, the atom demonstrator is generally designated by the numeral 10. Frame members 11 and 12 are provided fixed at their upper ends to a horizontal frame member 16. Each of the legs 11 and 12 has horizontally extending portions 13 and perpendicular upwardly extending portions 14. The frame 16 has a vertically extending portion 17 and an upper horizontally extending portion 18. A drive motor 19 is fixed to the frame portion 18 and has a drive shaft 20 carrying a pulley that drives belt 21 and an enlarged step-up pulley 22. Pulley 22, through shaft 24, drives a gear box 26 that is provided to give the necessary drive ratio to the demonstrator.

Gear box 26 has an output shaft 27 fixed to and supporting rotating yoke member 28. The yoke 28 has a transverse member 29 and outwardly extending arm portions 30 and 31. The arm portions 30 and 31, adjacent their outer end, rotatably receive a globe shaft 34 in bushings 36 and 37, respectively. Thus, the yoke 28 is rotated at a uniform speed by the drive motor 19 through shaft 27.

For the purpose of rotating globe 38 about the axis of shaft 34, a gear 40 is fixed with respect to frame 16. Gear 40 drives a cross-shaft 42 through bevel gear 43 drivingly intermeshing therewith. Shaft 42 is rotatably supported in a bearing in a projection 46 of arm 30 and a bearing boss 47 carried by transverse member 29. A bevel gear 49 is carried at the upper end of shaft 42 and drivingly engages bevel gear 50 carried by shaft 53. Shaft 53 is supported in bearing bosses 54 and 55 fixed to outwardly extending arm 30. Bevel gear 56, at the outer end of shaft 53, drivingly engages bevel gear 58 fixed to the upper end of globe shaft 34. The gearing in gear box 26, gears 40, 43, 49, 50, 56 and 58 are selected so that globe 38 rotates at approximately the same speed and uniformly about both the axis of shaft 27 and the axis of shaft 34. Thus, the globe 38 rotates about two separate perpendicular axes simultaneously.

The globe 38 has light bulbs 60, 61, 62 and 63 thereon. The light bulbs 60, 61, 62 and 63 are positioned on globe 38 in an imaginary plane 65. Plane 65 is approximately 45° with respect to the axis of shaft 34. Each of the bulbs is positioned in plane 65 at approximately 90° intervals about the periphery of globe 38. It should be understood that the bulbs 60, 61, 62 and 63 are shown in the same position with respect to the axis of shaft 34 in each of the views to avoid confusion, but of course since globe 38 rotates, the position of the bulbs will change.

Figure 3:
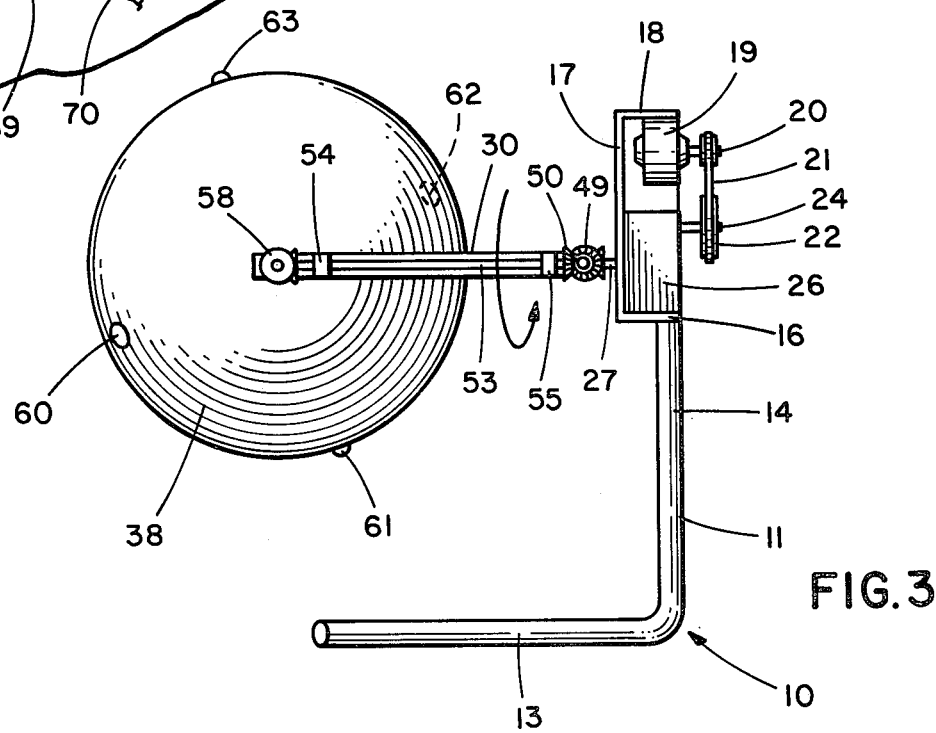
FIG. 3 is a right side view of the atom demonstrator of FIG. 1 with the yoke and globe each rotated 90°.

As seen in FIG. 3, the bulbs 60 are powered by a battery 66 having a frame 67 fixed to interior surface 68 of the globe 38. Wires such as shown at 69 and 70 provide current to each of the bulbs.

It is readily seen, that as the drive motor 19 is energized, the globe 38 will rotate both about the axis of shaft 27 and the axis of shaft 34 providing to the bulbs 60, 61, 62 and 63 the curvilinear motion that I desire. This motion is illustrated by paths 72, 73, 74, 75 and 76 in FIG. 7. The arrows illustrated in FIG. 7 indicate the direction of electron or bulb motion with the globe 38 being rotated in the direction of arrow 78 and the yoke 28 being rotated in the direction of arrow 79 in FIGS. 1 and 7.

When the demonstrator 10 is placed in a dimly lit room with drive motor 19 rotating yoke 28 and globe 38 at uniform and approximately the same speeds, with the lights 60, 61, 62 and 63 on, the lights will scribe a very vivid and dynamic path of electron motion.

It should be understood that the term "light emitting devices" as used in this specification, could be discharge lamps, reflectors or even jewels.

What is claimed is:

1. An atom demonstrator, comprising; frame means, a motor mounted on said frame means, a yoke rotatably mounted on said frame means about a first axis and driven by said motor, a globe rotatably mounted on said yoke, said globe being rotatably driven by said motor about a second axis stationary with respect to said yoke, said motor being connected to simultaneously rotate said yoke and said globe, and four light bulbs on said globe evenly spaced in a circle in a plane extending diametrically through the globe bulbs being present on the globe only in the aforementioned plane so that the bulbs represent the electrons of an atom so that as the globe is rotated simultaneously about the first and second axes, the bulbs will scribe curvilinear paths representing the motion of the electrons.

* * * * *